July 14, 1970  J. S. SMITH  3,520,455
METHOD FOR SEVERING CERAMIC BODIES BY LOCALIZED THERMAL ACTION
Filed Sept. 13, 1968
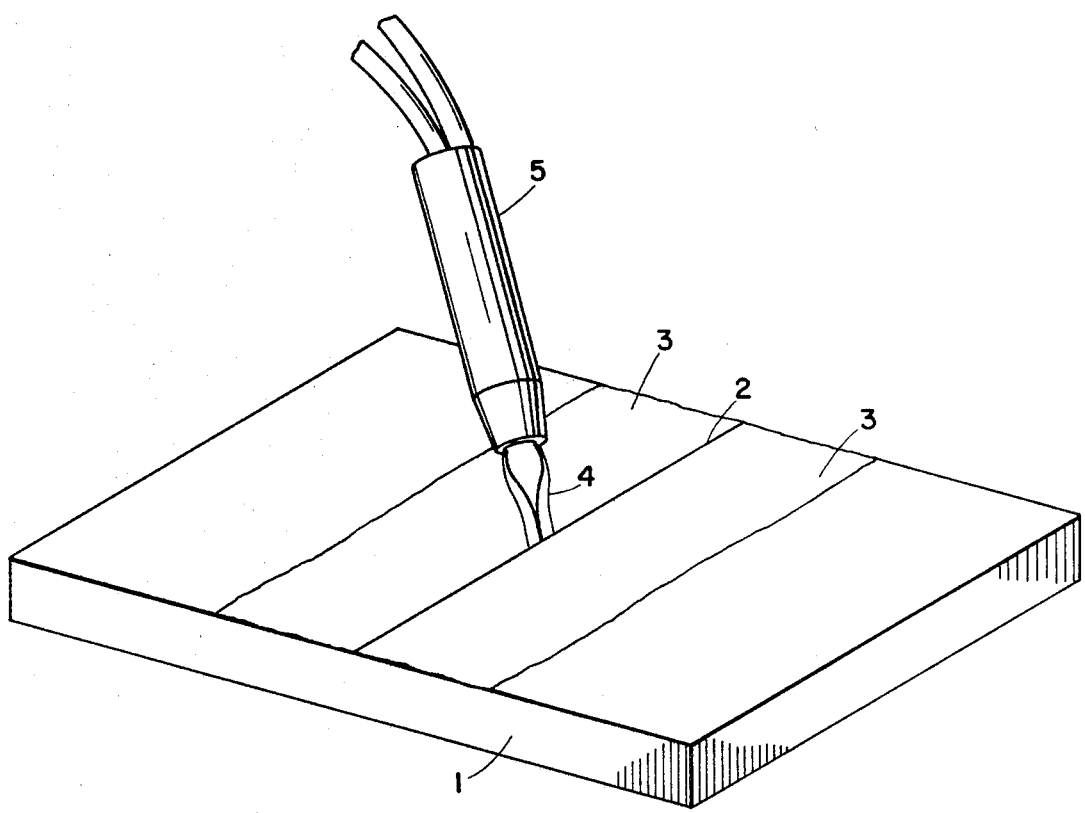
INVENTOR.
JAMES. S SMITH
BY
K.W. Brownell

United States Patent Office

3,520,455
Patented July 14, 1970

3,520,455
METHOD FOR SEVERING CERAMIC BODIES BY LOCALIZED THERMAL ACTION
James S. Smith, Ligonier, Pa., assignor to The Carborundum Company, Niagara Falls, N.Y., a corporation of Delaware
Filed Sept. 13, 1968, Ser. No. 759,681
Int. Cl. B26f 3/06
U.S. Cl. 225—1       8 Claims

ABSTRACT OF THE DISCLOSURE

A method is provided for severing or splitting ceramic bodies such as ceramic alumina tiles, bricks, tubes, rods, and the like, which includes applying a boron nitride containing coating adjacent the desired line of severance, and then locally heating the body along the line, for example, by means of a gas torch, which causes the body to sever or split along the line through localized thermal action.

BACKGROUND OF THE INVENTION

This invention relates to severing ceramic bodies and, more particularly, relates to a method for severing dense ceramic bodies such as ceramic alumina bodies by localized thermal action.

Heretofore, ceramic bodies, and particularly dense ceramic bodies such as ceramic alumina bodies in the shape of title, brick and the like, have been cut before firing, or have been cut after final firing by diamond sawing. These methods, however, have disadvantages as often the ceramic must be cut to particular dimensions at the site of use, and thus, custom cutting before firing is not feasible, while diamond sawing after firing is expensive and time consuming. Other attempts to sever or divide ceramic, for example, by mechanically breaking the material, often result in irregular break surfaces and/or a shattering or breaking of the material into several pieces.

SUMMARY OF THE INVENTION

Accordingly, the object of the present invention is to provide a method for severing or dividing ceramic bodies without incurring, or at least minimizing, the above disadvantages.

Other and further objects of the present invention will become apparent from the following description.

In accordance with the present invention, a method is provided for severing ceramic bodies which comprises applying a boron nitride containing coating adjacent the desired line of severance, and thereafter locally heating the body along the line, whereby localized thermal action causes the body to sever along the line.

This method is particularly applicable to dense ceramic bodies such as ceramic alumina bodies in the shape of tiles, bricks, rods, tubes and the like. However, the method is similarly applicable to any ceramic body subject to breakage when exposed to localized thermal action, such as dense magnesia or zirconia bodies, either fused or sintered.

BRIEF DESCRIPTION OF THE DRAWING

The drawing is a perspective view in which one embodiment of the present invention is illustrated.

DESCRIPTION OF THE PREFERRED EMBODIMENTS

Referring to the drawing, an alumina title or slab 1 is to be severed or divided along line 2. A boron nitride containing coating 3 is applied adjacent each side of severance line 2. Alumina body 1 is then locally heated by means of flame 4 from oxyacetylene torch 5 by moving the torch flame back and forth from end to end as steadily as possible the full length of the line 2. The dense ceramic alumina body 1 then simultaneously severs or splits into two pieces at line 2 with a comparatively smooth break surface.

Ceramic bodies or articles which can be severed or split in accordance with the present invention include ceramic refractory tile, brick, rods, tubes and the like, and, more particularly, ceramic bodies having a density such that the body is incapable of sustaining localized heating without failure. For example, the method has been highly effective with dense alumina bodies of from approximately 3.20 grams/cm.$^3$ to approximately 3.80 grams/cm.$^3$ density.

Further, ceramic bodies which may be treated in accordance with the present invention may be of various sizes and shapes, with tile-shaped and brick-shaped ceramic bodies or articles being particularly well suited, providing the body is not of excessive thickness. Bodies as thick as four inches have been satisfactorily severed. The line of severance is usually straight, but may be curved.

The boron nitride containing coating which is applied to the ceramic body adjacent the desired line of severance should contain as a minimum sufficient boron nitride to impart the high thermal conductivity characteristics of boron nitride to the coating. Boron nitride is a well-known compound, and is available commercially as a white fluffy powder or as a boron nitride containing coating material.

The boron nitride containing coating which is employed in the present invention is one which upon drying on the ceramic body will tightly adhere to the surface of the body during the localized heating step and will reflect and conduct to a great extent any thermal energy to which it is exposed.

For purposes of this invention aqueous dispersions of boron nitride powder having a particle size of less than 325 mesh are satisfactorily, although alcohol-based dispersions, or other suspended or dispersed forms of boron nitride materials may be employed.

Further, the boron nitride containing coating may contain other ingredients such as the material sold by Monsanto Chemical Company under the trademark Alkophos®, which is a solution of aluminum phosphate dissolved in phosphoric acid; and/or phosphoric acid, $H_3PO_4$. These ingredients function as bonding agents for the boron nitride.

The boron nitride containing coating should be applied to the ceramic body so that a coating having an average thickness of about 0.003" to 0.007" is achieved. Thicker coatings, while functionally acceptable, are unnecessary and wasteful.

The boron nitride containing coating should be applied all along one or both sides, but not directly on, the desired line of severance or splitting. The coating should be approximately two inches wide on each side of the desired line of severance as measured in a line perpendicular to the desired line of severance where the size of the body and the location of the cut will permit.

As stated, the coating should not cover the desired line of severance. To achieve this, the line may be masked with a rubber band, tape or the like, while coating, and then removed before the localized heating step. Alternatively, the area in which the desired line of severance is found may be completely coated with the boron nitride, the coating dried, and then a desired line of severance scribed through the coating such as by a stylus or sharpened hard graphite pencil to provide an uncoated desired line of severance.

When the coating is applied adjacent both sides of the desired line of severance, the uncoated line should be about the width of a heavy pencil mark, or expressed numerically, about 1/16 inch to 1/32 inch wide.

As stated, the coating may be applied only along one side of the line of severance. This may be desirable, for example, when splitting small pieces off of a relatively large ceramic body. The uncoated small pieces may, however, shatter or break into many small pieces.

The boron nitride containing coating may be applied to the ceramic body by any of several coating methods such as brushing, roll coating, dipping, spraying or the like. Brushing is preferred, with brush strokes parallel to the desired line of severance.

The boron nitride containing coating should be substantially dry before attempting the localized heating step. Otherwise, the coating may flake when the localized heat is applied and produce an uneven cut or break edge.

Suitable methods of drying include air or atmosphere drying for sufficient time to dry the coating, oven drying in air or other gases at temperatures of about, for example, 150° to 300° F., or drying by means of a radiant heat source such as a gas burner or an electrical resistance heater.

After the coating is dried, the ceramic body is locally heated relatively uniformly all along the desired line of severance, until the body simultaneously severs or splits along that line as a result of localized thermal action.

The body may be locally heated by means of gas burners such as oxyhydrogen, oxyacetylene and propane torches or any other means of supplying a comparable localized heat flux.

The severing or splitting takes place spontaneously within about 60 seconds to about five minutes to produce a comparatively smooth break surface and seldom do small fragments of the material fly off or shatter, with the rejection percentage normally limited to a low value.

When gas flames are used, they are preferably adjusted to produce a nonoxidizing flame. This is normally indicated by a greenish "feather" around the blue inner cone of the flame. The blue inner cone is preferably about 3/16 of an inch long. The flame is then used to heat the desired line of severance by either moving back and forth from end to end as steadily as possible through the full length of the line at a rate of about two inches per second, or a plurality of gas flames may be situated all along the line of severance.

Gas flame temperatures are adjusted according to the particular ceramic body as well as the type of coating and amount of coating applied, and generally speaking, if the flame is too cold the body will not split in a reasonable time, and if the flame is too hot the coated surface will spall and produce uneven breaks at the ends of the desired line of severance.

Normally, the best severing or cutting is obtained when there is an equal mass or ceramic on each side of the desired line of severance. Regardless of area or thickness, good cuts can be obtained within the center third of the item, i.e. if the ceramic is three inches wide, breaks in the one inch center section will be rather straight. Beyond this area, and as the edges are approached, the cut will have a tendency to curve toward the narrow edge or corner of the part. This can be overcome somewhat by moving the torch faster along the center of the line than at each end.

When removing the small corners, the boron nitride coating should not be applied to the corner section, but the normal coating should be applied to the remaining section adjacent the desired line of severance. After heating the line and the coated portion for a time, the uncoated section should then be heated directly to produce the desired break along the line or edge of the boron nitride coating.

Large radii may also be cut, and angles on tile or brick shapes can be cut in accordance with the present invention.

Furthermore, when cutting pieces of various widths, the larger widths should normally be cut first, that is, it is normally easier to split, for example, a two inch wide tile into one inch pieces than it is to cut a one inch wide strip from a full tile of, for example, four inches square.

Any small ragged protrusions on the cut or break edges may be removed by holding the gas flame directly on the piece to be removed which will then break or shatter off.

EXAMPLE

A boron nitride containing coating was formulated by mixing 1386 grams of Alkophos® solution, 1956 grams phosphoric acid, $H_3PO_4$, and 5358 mls. water along with 5400 grams boron nitride powder of under 325 mesh particle size. The mixture was then agitated in a five gallon container using a high shear agitator sold under the Lightning brand name.

The mixture was then placed in a vacuum chamber to remove air entrapped during mixing.

A four inch by four inch by 1/4 inch ceramic alumina tile of high density was then scribed with a pencil to define a line of severance down the center of the tile. The pencil line was then masked with a rubber band, and a two inch wide strip of boron nitride containing coating as formulated above was then painted on the surface adjacent each side of the mask. The coating was applied with a paint brush with strokes parallel to the mask. This coating was about 0.005 inch thick.

The coating was then dried with a gas radiant burner.

After drying, the rubber band mask was removed by gently lifting from one end so as not to tear or disrupt the coating.

An oxyacetylene torch was then used to provide localized heating along the line. The torch was a Harris #18-2 automatic type torch with a #2 welding or brazing tip. Gas regulators for the torch were set to provide approximately 14 p.s.i. (static) of oxygen and 7 p.s.i. (static) of acetylene. The torch was then adjusted to produce a nonoxidizing flame, as indicated by a greenish feather around the blue inner cone of the flame. The blue inner cone was about 3/16 of an inch long.

The torch was then used to heat the pencil line by moving back and forth from end to end as steadily as possible through the full length of the line at a rate of about 2 inches per second. The tip of the blue cone was in contact with the line.

In about 2 to 3 minutes a gray area developed on each side of the line as the boron nitride coating was heated. Evenness of the heating was determined by the width and uniformity of the gray area. About 1 to 1½ minutes after the gray area developed, the ceramic alumina broke along the penciled area between the two strips of coating with a comparatively smooth break edge.

The remaining boron nitride containing coating was then washed off of the pieces of tile with water.

The principles, preferred embodiments, and modes of operation of the present invention have been described in the foregoing specification. The invention which is intended to be protected herein, however, may be practiced otherwise than is described with departing from the scope of the appended claims.

I claim:
1. A method for severing ceramic bodies which comprises: applying a boron nitride containing coating adjacent the desired line of severance, and thereafter locally heating the body along the line, whereby localized thermal action causes the body to sever along the line.

2. The method of claim 1 wherein said coating comprises boron nitride, suspended in an aqueous solution.

3. The method of claim 2 in which the aqueous solution is a phosphate binder.

4. A method for severing ceramic bodies which comprises: applying a coating comprising boron nitride and a suitable binder therefor adjacent each side of a desired line of severance, drying the coating, and thereafter locally heating the body along the line whereby localized thermal action causes the body to sever along the line.

5. A method according to claim 4 in which the ceramic body is alumina.

6. The method of claim 4 wherein the coating is applied by brushing parallel to the desired line of severance.

7. The method of claim 6 wherein the coating is about 0.003" to 0.007" in thickness.

8. The method of claim 7 which comprises locally heating the body by means of a gas torch.

References Cited

UNITED STATES PATENTS

| | | | |
|---|---|---|---|
| 237,112 | 2/1881 | King | 225—1 X |
| 494,999 | 4/1893 | Evans | 225—1 X |

FRANK T. YOST, Primary Examiner

U.S. Cl. X.R.

225—93.5